US 6,652,788 B1

(12) United States Patent
Miyake et al.

(10) Patent No.: US 6,652,788 B1
(45) Date of Patent: Nov. 25, 2003

(54) QUANTITATIVE CONTINUOUS SUPPLYING METHOD OF COLUMNAR OR SQUARE COLUMN-FORM PELLETS BY ACTION OF ULTRASONIC WAVES

(75) Inventors: Ken Miyake, Hyogo (JP); Tsutomu Igase, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 186 days.

(21) Appl. No.: 09/666,537

(22) Filed: Sep. 21, 2000

(30) Foreign Application Priority Data

Sep. 22, 1999 (JP) .......................... 11-268551
Aug. 23, 2000 (JP) ...................... 2000-252598

(51) Int. Cl.$^7$ ............................. B29C 47/08
(52) U.S. Cl. .................. 264/70; 264/176.1; 264/328.1; 264/444; 264/443
(58) Field of Search ................... 264/70, 442, 443, 264/444, 78, 176.1, 328.1, 75, 211.21; 425/417, 580

(56) References Cited

U.S. PATENT DOCUMENTS

| | | | | |
|---|---|---|---|---|
| 3,194,855 A | * | 7/1965 | Jones ........................ 264/29.1 |
| 3,619,429 A | * | 11/1971 | Torigai et al. .......... 264/171.14 |
| 3,722,755 A | * | 3/1973 | Nakashima ................. 222/193 |
| 4,001,172 A | * | 1/1977 | Steinkamp et al. ......... 428/131 |
| 4,188,268 A | * | 2/1980 | Sugahara et al. ............. 205/63 |
| 4,793,954 A | * | 12/1988 | Lee et al. .................... 264/108 |
| 4,894,088 A | * | 1/1990 | Yamaguchi et al. .......... 419/11 |
| 5,258,413 A | * | 11/1993 | Isayev ........................ 264/444 |
| 5,284,625 A | * | 2/1994 | Isayev et al. ............... 422/128 |
| 5,799,880 A | * | 9/1998 | Roberson et al. ............... 241/1 |
| 5,868,153 A | * | 2/1999 | Cohen et al. .................. 137/13 |
| 5,906,294 A | * | 5/1999 | Ikeya et al. .................. 222/200 |
| 5,917,266 A | * | 6/1999 | Murai et al. ........... 310/316.01 |
| 5,929,552 A | * | 7/1999 | Ikeya ......................... 310/325 |
| 5,955,035 A | * | 9/1999 | Dinzburg et al. ........... 422/128 |
| 6,050,393 A | * | 4/2000 | Murai et al. ................ 198/533 |
| 6,096,440 A | * | 8/2000 | Moriya et al. .............. 428/195 |
| 6,361,733 B1 | * | 3/2002 | Eicher et al. ................ 264/443 |
| 6,380,264 B1 | * | 4/2002 | Jameson et al. ......... 239/102.2 |
| 6,386,748 B1 | * | 5/2002 | Huber et al. ................. 366/108 |
| 6,395,216 B1 | * | 5/2002 | Jameson ..................... 264/442 |
| 6,416,705 B1 | * | 7/2002 | Dinzburg et al. ............... 241/1 |

FOREIGN PATENT DOCUMENTS

| | | | | |
|---|---|---|---|---|
| JP | 62249717 A | * | 10/1987 | ........... B29C/45/00 |
| JP | 03253323 A | * | 11/1991 | ........... B29C/47/08 |
| JP | 2001158019 A | * | 6/2001 | ........... B29C/31/06 |

* cited by examiner

Primary Examiner—Mark Eashoo
Assistant Examiner—Geoffrey P. Shipsides
(74) Attorney, Agent, or Firm—Armstrong, Westerman & Hattori, LLP.

(57) ABSTRACT

A quantitatively extrusion supplying method of continuously supplying synthetic resin fine particulate matters by the action of ultraviolet vibration, wherein the fine particulate matters are composed of columnar or square column-form small pellets, in which when the longitudinal length, the width, and the height thereof on the three-dimensional rectangular coordinate are x, y, and z respectively, the sum of x, y, and z is in the range of from 0.9 to 4.6 mm, and each value of x, y, and z is at least 20% of the sum x, y, and z. By the method, even the resin fine particulate matters having a diameter of 500 $\mu$m or larger can be stably and continuously supplied in a short time without need of a labor and time for cleaning a ultraviolet feeder at changing the material to be conveyed.

2 Claims, 2 Drawing Sheets

QUANTITATIVE CONTINUOUS SUPPLYING METHOD OF COLUMNAR OR SQUARE COLUMN-FORM PELLETS BY ACTION OF ULTRASONIC WAVES

FIELD OF THE INVENTION

The present invention relates to a quantitative continuous supplying method using the action of ultrasonic vibration and more specifically to a method capable of quantitatively continuous-supplying by the action of ultrasonic vibration small particulate matters having a diameter of 500 μm or larger, which has hitherto been difficult to supply by the action of ultrasonic vibration, by limiting the shape of the resin fine particulate matters to be quantitatively supplied to a definite range; a production method of moldings using the above-described method; and a thermoplastic resin composition used for the above-described method.

BACKGROUND OF THE INVENTION

A general feeder conveys powders or particulate maters by rotating a screw or a spiral-form rod, and supplied a definite amount of powders or particulate matters by a method of supplying a definite amount thereof by controlling the rotation number or while calculating a part or the whole of the feeder and by detecting the changing amount to reflect it to the rotation number. As a specific form of the feeder, there is a feeder using a ultrasonic wave and such a feed is known as a ultrasonic motor-type powder feeder.

The basic principle and the controlling method of the ultrasonic feeder are described in JP-A-7-33228 (the term "JP-A" as used herein means an "unexamined published Japanese patent application"), U.S. Pat. No. 5,917,266, DE 19742663, U.S. Pat. Nos. 6,050,393, 5,906,294, and 5,929,552, JP-A-278902, etc. The ultrasonic feeder utilizes the synthetic elliptical motion of the longitudinal vibration and the bending vibration at the tip of the ultrasonic motor and has been developed for carrying out the continuous quantitative supply of a slight amount of particulate matters, mainly metal powders having a diameter of not lager than 500 μm with a high accuracy.

In the case of particulate matters having a diameter of 500 μm or larger, it sometimes happened that safely conveying the particulate matters by only the vibration of ultrasonic wave was difficult. Therefore, it was not practiced to continuously supplying pellets of a colorant or an additive for a synthetic resin, having a diameter of 500 μm or larger, by the ultrasonic feeder.

On the other hand, as a method of adding and compounding a colorant or additive(s) to and with a thermoplastic resin in the case of producing extruded moldings or injection moldings using a screw feed extruder, a master batch has been used in various fields because of the easiness of handling at adding and compounding. The master batch contains one or more kinds of colorant(s) and additive(s) and is kneaded with a resin and the like, which becomes a vehicle, in a body. The using method of the maser batch differs according to the difference in a supplying method thereof.

Such a master batch is generally diluted with resin pallets to be colored or to be added to from 5 to 50 times, after mixing by a tumbler, mixer, and the like, the mixture is placed in a hopper, kneaded by a heated extruder screw for molding, and after being unified, is molded.

As other method, there is a method of continuously supplying to a molding machine while measuring the weight or the volume and in the method, the maser batch and a resin are generally conveyed by the rotation of a screw or a spiral rod. In the method, by separating the inlet of the master batch and the inlet for a resin to be treated, the master batch can be supplied without being restricted on the shape of the master batch.

JP-A-11-279282 discloses pellet-form thermoplastic resin composition, which is used for the above-described method, capable of establishing a high dilution ratio by improving the peptizing property and the quantitative supplying property.

On the other hand, JP-A-60-18529 proposes the use of a mixture of a mater batch largely containing a flame retardant or a filler with a coloring master batch and a resin to be colored. However, actually, because the separation of the mater batches occurs, the desired result has not yet been obtained. Accordingly, it has been considered to be difficult to add the mixture in the base color as it is before the final molding step. To solve such a fault, in JP-A-7-216099 it is proposed, about the at least two kinds of pellets constituting the composition, to reduce the specific gravities thereof with a foaming agent, etc., or controlling the apparent specific gravity of each constituent by increasing the specific gravity thereof with an inorganic filler.

Certainly, according to the method, the specific gravity difference of each base color master batch can be controlled below 0.5 $g/cm^2$. However, since by the addition of a foaming agent and an inorganic filler, a cost up and the deterioration of the quality occur, and further since the errors of the addition amounts of the foaming agent and the inorganic filler by calculation from the practical ratio are large, and also the management terms are increased to complicate the steps of the method, it is the actual circumstances that there are many different points for practically using by controlling the additives.

Also, in JP-A-7-102155, it is proposed to establish the weight of a colorant master batch to pellets to be colored to the ratio of from 0.45 to 0.95 for preventing the occurrence of uneven color of the colored moldings caused by the separation of maser batch. However, in the method, it is the actual circumstances that the shape deviation becomes large in the field of requiring the addition of a large amount of an inorganic pigment and it is difficult to keep a uniform mixed state.

Also, JP-A-11-279282 discloses synthetic resin pellets on the assumption that the pellets are used for a quantitative supplying apparatus using a screw-type feeder of background art. However, the disclosed invention relates to coloring pellets for being mixed with rein pellets to be colored having ordinary size·shape, and in the invention, the pellet size is finer than an ordinary level, and by forming fine particle sizes of the dimensions in a specific relatively narrow range and making a shape indispensably having a partially flat surface such that the orthogonal projection for a certain direction of the particle shows a regular square or a rectangle, the uniform mixing performance and the quantitative supplying performance of the pellets are improved to effectively prevent the occurrence of uneven coloring, etc., whereby satisfactory effects are obtained. However, the content of the invention disclosed in the above-described patent invention utilizes a screw-type feeder and it is the actual circumstances that the problems described below occurring the use of a screw-type feeder have not been solved.

A feeder for quantitatively supplying a material to a screw-type extruding kneader of background art is generally one wherein a screw and a motor are connected in a body and there is a problem that the structure is larger than a ultrasonic feeder and a power for moving a large apparatus is necessary, and also at cleaning the feeder in the case of changing a material to be conveyed, there is a problem that a labor of dismounting complicated apparatus and cleaning is required, and furthermore, there is also a problem that a long time is required until the material supplying amount at the practical production reaches a desired established value and is stabilized.

On the other hand, a ultrasonic type powder feeder was developed for carrying out the continuous supply of powders having a diameter of not larger than 500 μm with a high accuracy but it was difficult to use the feeder for carrying out a stable continuous supply of particulate matters having a diameter of 500 μm or larger. The 1st reason that the stable continuous supply is difficult for the particulate matters having a diameter of 500 μm or larger is in the point that by increasing the particle sizes, there is a limit in the distance of moving the particulate matters by the vibration only of ultrasonic waves and a continuous flow of particulate matters that the pushed particulate matters move and next particulate matters are brought into contact with the vibrating surface of ultrasonic waves is hard to occur, whereby a continuous supply of the particles with a high accuracy becomes difficult. Also, the 2nd reason that feeding the particulate matters having a diameter of 500 μm or larger is difficult is in the point that when particulate matters become large, the contact areas of the particulate matters with the vibration surface of ultrasonic waves per unit weight become small, whereby it becomes difficult to move the particulate matters by the vibration force only of ultrasonic waves.

SUMMARY OF THE INVENTION

Thus, for solving the above-described problems of background art, an object of the present invention is to provide a method of capable of stably and continuously supplying even fine particulate matters having a diameter of 500 μm or larger by utilizing the merits of a small-sized ultrasonic feeder without need of a labor and time for cleaning the feeder at changing the material to be conveyed and also without requiring a long time for attaining the desired established supplying amount, to provide a method of producing moldings used the method, and also to provide synthetic resin fine particulate matters which can be applied to the method.

That is, as the result of various investigations for solving the above-described problems, the present inventors have found that when synthetic resin fine particulate matters are in a certain range, the particulate matters can be stably and continuously supplied by using small-sized ultrasonic feeder without need of a labor and time for cleaning the feeder at changing the material to be conveyed and also without requiring a long time for attaining the desired established supplying amount, and have accomplished the present invention.

That is, for solving the above-described problems, (I) An aspect of the present invention provides a quantitative extrusion supplying method of continuously supplying synthetic resin fine particulate matters by the action of ultrasonic vibration, wherein the synthetic resin fine particulate matters are columnar or square column-form small pellets, in which when the longitudinal length, the width, and the height thereof on the three-dimensional rectangular coordinate are x, y, and z respectively, (1) the sum of the longitudinal length, the width, and the height (x+y+z) is in the range of from 0.9 to 4.6 mm, and
(2) each value of x, y, and z is at least 20% of the sum (x+Y+z) of the longitudinal length, the width, and the height (hereinafter, is referred to the 1st invention).

Also, for solving the above-described problems, (II) other aspect of the invention provides a method of producing extrudsion moldings or injection moldings by supplying a raw material resin to be colored or to be added to an inlet of a screw feed extruder, continuously supplying a particulate colorant master batch or a particulate additive master batch through a quantitative supplying apparatus to the extruder separately from the raw material resin from an inlet separately formed from the inlet for the raw material resin, and melt-kneading the both constituents, wherein
(A) the colorant or the additive is columnar or square column-form small pellets, in which when the longitudinal length, the width, and the height thereof on the three-dimensional rectangular coordinate are x, y, and z respectively,
(A-1) the sum of the longitudinal length, the width, and the height (x+y+z) is in the range of from 0.9 to 4.6 mm, and
(A-2) each value of x, y, and z is at least 20% of the sum (x+Y+z) of the longitudinal length, the width, and the height,
(B) the pellets are pellets of one color colored in a base color or a desired color or of a mixed state of at least two base colors, or are pellets containing at least one additive other than a colorant, and
(C) the quantitative supplying apparatus of the colorant or the additive is an apparatus of quantitatively extruding supplying the synthetic resin fine particulate matters by the action of ultrasonic waves (hereinafter, is referred to the 2nd invention).

Furthermore, for solving the above-described problems, (III) still other aspect of the invention is to provide a thermoplastic resin composition containing a pellet-form colorant or additive, without carrying out a mixing operation of a resin composition containing a colorant or an additive with a raw material resin to be colored or to be added by a blender or a mixer, which is used in the case of continuously supplying to the upper portion of the screw of a molding machine using a quantitative supplying apparatus of supplying synthetic resin fine particulate matters by the action of ultrasonic vibration, wherein
(A) the pellet-form colorant or additive is columnar or square column-form small pellets, in which when the longitudinal length, the width, and the height thereof on the three-dimensional rectangular coordinate are x, y, and z respectively,
(A-1) the sum of the longitudinal length, the width, and the height (x+y+z) is in the range of from 0.9 to 4.6 mm, and
(A-2) each value of x, y, and z is at least 20% of the sum (x+Y+z) of the longitudinal length, the width, and the height, and
(D) in the pellets, the orthogonal projection from a certain direction shows a square or a rectangle (hereinafter, is referred to as the 3rd invention).

Moreover, for solving the above-described problems, (IV) another aspect of the invention provides the thermoplastic resin composition of above-described (III) wherein the pellets are;

(E) a material in which when in the two adjacent sides of the regular square or the rectangle becoming the orthogonal projection thereof, a long side is (a) and a short side is (b), the value of (a)/(b) is in the range of from 1 to 1.4, and also (F) a material in which about optional 10 pellets, when average value of the sum total value of the lengths of the adjacent two sides is (c) and the standard deviation thereof is (d), the value of (d)/(c) does not exceed 0.1 (hereinafter, is referred to as the 4th invention).

DETAILED DESCRIPTION OF THE INVENTION

Figure 1:
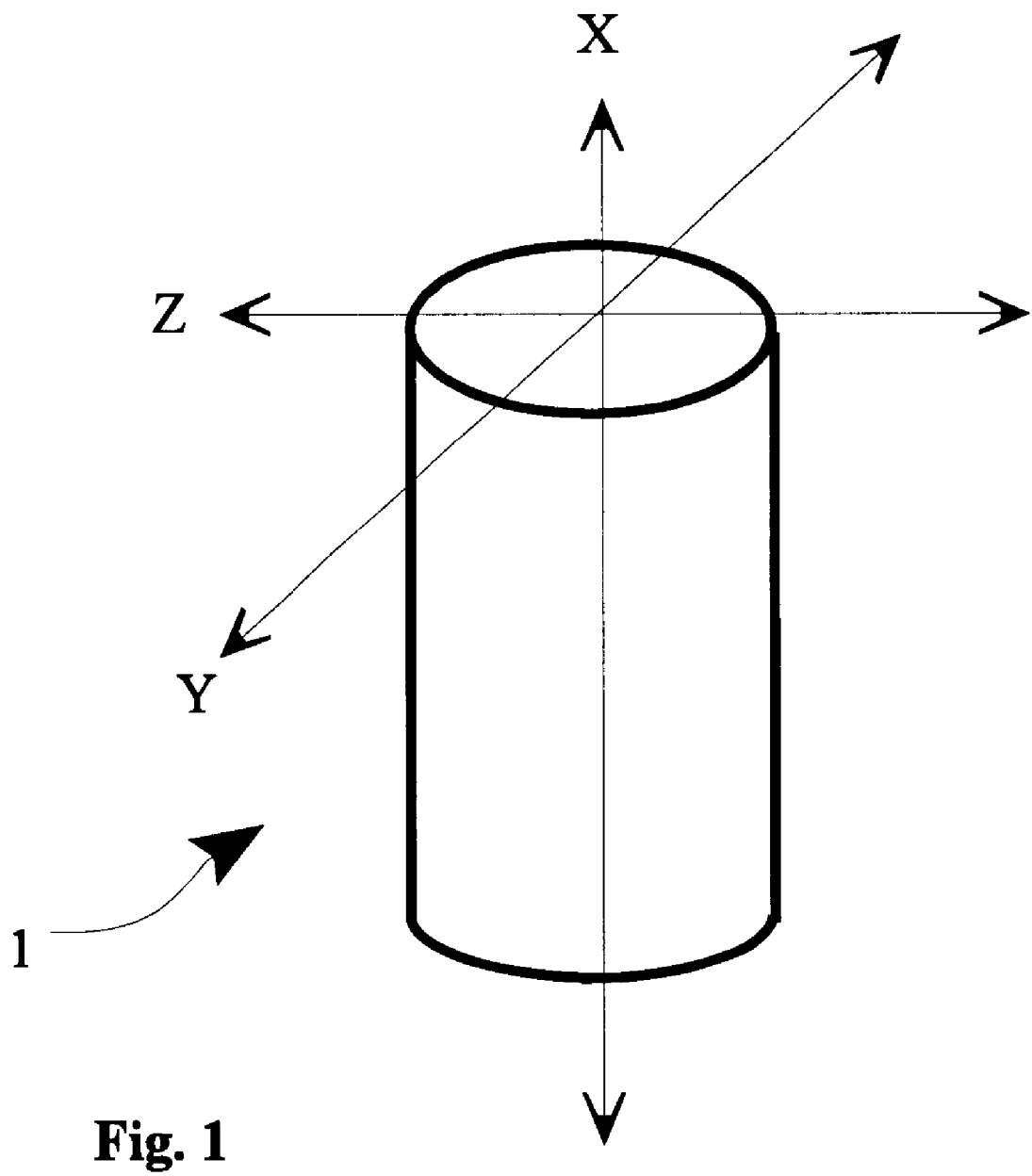
FIG. 1 shows a columnar pellet of the present invention.
Figure 2:
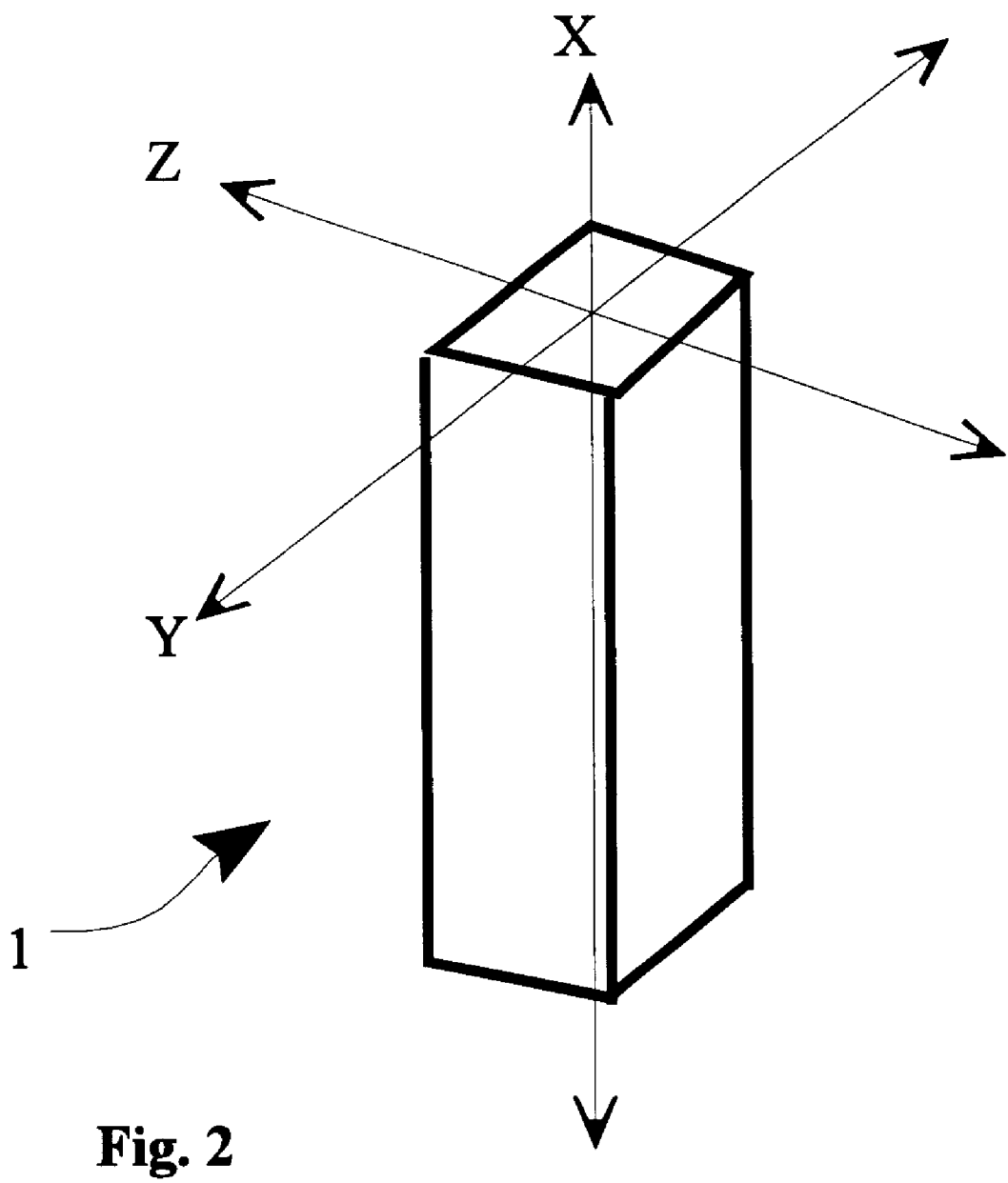
FIG. 2 shows a pellet of square-column form of the present invention.

Then, the present invention is described in detail.

In the invention, the ultrasonic feeder is an apparatus of conveying powders using a ultrasonic driving apparatus giving ultrasonic vibration and as described in detail thereof in JP-A-7-33228, JP-A-10-116121, JP-A-10-116122, JP-A-10-116125, JP-A-10-142034, JP-A-10-174469, and JP-A-10-278902, is the apparatus of quantitatively conveying or supplying powders with a high accuracy by utilizing the elliptical motion of the vibrating portion. The apparatus has the features that the apparatus is small-sized, light-weight, deviation of the flow rate is small, the supplying amount is stable, and the response of flow rate control of powders is very fast as compared with a feeder of background art composed of a screw and a motor.

As the additive used in the composition of the invention, any additive which can be utilized for obtaining the moldings of a thermoplastic resin can be used. Also, there is no particular restriction on the colorant used in the invention, and organic pigments, inorganic pigments, and dyes, which do not cause a thermal decomposition at the addition to a molten resin, can be used. In addition, "additives" as used herein includes a colorant in a wide sense but when a colorant and additive(s) are separately described herein, the additive(s) means various additives other than a colorant.

Also, other additives than colorants are known additives such as metal soaps, ultraviolet absorbents, antioxidants, flame retardants, antistatic agents, anti-bacterial agents, etc., and there are no particular restriction on the additives if they do not cause a thermal decomposition at the addition to a molten resin. Also, the additives are not limited to one kind. The concentrations of colorant and additive(s) are from 0.1 to 90% by weight.

As the resin used as a behicle resin in the invention, that is the resin becoming the raw material for the synthetic resin particulate matters, any resin which is a solid at room temperatures, is a same kind as the resin to be added used in the invention or has a compatibility with the resin, and does not cause a clear denaturation by the thermal decomposition or the thermal deterioration by the thermal history of an excluder can be used, and the resin preferably includes a polyethylene-base resin, a polypropylene-base resin, a polystyrene-base resin, a polyamide-base resin, a polyester-base resin, etc. Furthermore, other resins which have a good dispensability of additive(s), have a good compatibility with the resin to be added, and are solid at room temperatures can be used without problems. About the shape of the resin, the shape of a commercially available resin, chips for regeneration, flakes, compressed particulate matters of films, etc., can be used without any problems. That is, the resin having a spherical shape, a columnar shape, a cubic shape, or a flaky shape can be used without problems.

The shape of the fine particulate matters (the resin composition containing a colorant or additive(s)) regulated in the invention is a cube, a rectangular parallelepiped, or a columnar shape and such a shape can be formed by the combination of the apparatus such as an extruder, a water bath for cooling, and a pelletizer. Also, in the invention, the pellets having the shape wherein the sum total of the longitudinal length (x), the width (y), and the height (z) is 4.6 mm or less, can be produced by changing at least one of (1) the increase of the number of holes of the outlet portion, (2) the increase of the speed of the rotary blade of the pelletizer, and (3) the increase of the number of blades in the above-described production apparatus.

In the synthetic resin fine particulate matters used in the invention, it is necessary that the dimensions on the three-dimensional rectangular coordinate, that is the sum of x (the longitudinal length), y (the width), and z (the height) is in the range of from 0.9 to 4.6 mm. When the value is smaller than 0.9 mm, for example, x=0.3 mm, y=0.3 mm, and z=0.2 mm, that is, in the case of columnar fine particulate matters wherein the x-y surface is a circle, the static electricity of the fine particulate matters becomes large and thus the synthetic resin fine particulate matters are liable to be influenced by the static electricity more than the gravity of the fine particulate matters, whereby there are tendencies that the quantitative supplying accuracy is lowered and the stop of supplying is liable to occur.

On the other hand, when the dimensions on the three-dimensional rectangular coordinate, that is the sum of x (the longitudinal length), y (the width), and z (the height) is larger than 4.6 mm, for example, in the case of the fine particulate matters of a rectangular parallelepiped of x=1.5 mm, y=1.5 mm, and z=1.7 mm, because of the too large shape, there is a tendency that the stop of supplying is liable to occur.

Furthermore, in the synthetic resin fine particulate matters used in the invention, it is necessary that the dimensions on the three-dimensional rectangular coordinate, that is the sum of x (the longitudinal length), y (the width), and z (the height) is in the range of from 0.9 to 4.6 mm and also, each value of x, y, and z is at least 20% of the sum (x+y+z) of the longitudinal length, the width, and the height. When the value of one of x (the longitudinal length), y (the width), and z (the height) is less than 20% of the sum (x+y+z) of the longitudinal length, the width, and the height, there are for example the fine powder of the rectangular parallelepiped of x=0.5 mm, y=1.0 mm, and z=1.5 mm and the fine columnar powder having a diameter of 0.5 mm and a length of 1.6 mm. These sheet-form or a long and slender form powders cannot be stably quantitatively supplied for a long time by a ultrasonic feeder.

The synthetic resin fine particulate matters used in the invention are pellet-shape particulate matters having above-described size and a material in which when in the two adjacent sides of the square or the rectangle becoming the orthogonal projection thereof, a long side is (a) and a short side is (b), the value of (a)/(b) is in the range of from 1 to 1.4, and in which about optional 10 pellets, when average value of the sum total value of the lengths of the adjacent two sides is (c) and the standard deviation thereof is (d), the value of (d)/(c) does not exceed 0.1 is more preferred.

When the value of (a)/(b) is 1.4, the fine particulate matters are, for example, columnar fine particulate matters of x=1.0 mm, y=1.0 mm, and z=1.4 mm, the values of y and z are practically measured, 10 sum total values thereof are obtained, and from the standard deviation (d) thereof and the average value (c), the value of (d)/(c) is obtained. The vale of (d)/(c) in this case is the coefficient of variation of the total sum values of y and Z of the pellets and when there is no dispersion in the shapes, the value of (d)/(c) becomes smaller than 0.1. That is, when the shapes of the pellets are similar to a cube and the sizes thereof are almost uniform in any pellets, the fine particulate matters satisfy the above-described conditions. The supplying accuracy of a ultrasonic feeder using synthetic resin fine particulate matters is more improved when the shapes thereof are more similar to a cube and the sizes thereof are uniform in the conditions described above.

A method of melting a thermoplastic resin and cutting the molten resin directly after emerging from an outlet portion in water is a production method of pellets usually applied to an olefin resin but since the molten resin wholly tends to become a spherical form simultaneously with cutting, the pellet does not become a columnar form and it is impossible to make the shape a square or a rectangle from one direction. In this case, because there are no planes, the contact of the pellets each other is at a point only, whereby the contact area of the maser batches each other per unit volume becomes small. As the result thereof, the function of preventing the separation of the master batches by the surface friction becomes undesirably weakened.

A master batch of background art is used by mixing with a resin to be added in a pellet form and thus it is necessary to consider the influence of the specific gravity. However, the master batch which is one embodiment of the pellet-form synthetic resin fine particulate matters used in the invention estimates the case of using a quantitative supply apparatus of supplying the master batch to the screw portion of a molding machine through a different route from the route for the resin to be added and in this case, by increasing the contact area of the master batches each other per unit volume, the master batches can be kept at a uniform state without considering the uneven distribution by the specific gravity and the separation thereof.

As the columnar pellets used in the invention, columnar pellets that the diameter of the circle is in the range of from 0.3 to 1.5 mm and the height of the column is in the range of 0.3 to 1.5 mm are preferred. Incidentally, in the pellet that the diameter of the circle is 1.0 mm and the height of the column is 1.0 mm, the value of x+y+z becomes 3.0.

In a master batch of background art, the upper limit of the dilution ratio is established from the dispersing performance of the screw of a molding extruder, and the upper limit is usually from 5 to 50 times. However, when the shape of the master batch which becomes the precondition thereof becomes greatly small, in the stage of directly after being supplied to the screw, the volume of the master batch of background art is greatly dispersed, whereby the master batch is already dispersed before kneading with the resin to be added. Practically, by carrying out a trial calculation about columnar pellets, when the pellet having a diameter of 3.5 mm and the length of 3.5 mm is compared with the pellet having a diameter of 1.0 mm and the length of 1.0 mm, there is a volume difference of about 43 times. That is, the use of the pellet of the latter size means that it becomes unnecessary to disperse the pellet to 1/43 by the screw as compared with the case of using the pellet of the former size. On the contrary, when the case of using the same screw is considered, even when a higher dilution ratio is established, the conventional dilution uniformity can be maintained.

The synthetic resin particulate matters used in the invention is a pellet-form resin composition having specific size and shape, which shows that powder form matters, granular form matters, and flaky form matters are not included in the scope of the invention. Powders, granules, or flaky matters are liable to contain fine particles and the shape thereof is liable to be broken during passing a feeder, whereby they tend to be deformed to smaller matters. Also, when the amount of fine particles exceeds a definite amount, the problems of scattering the resin composition and the attaching and separation of the resin composition by static electricity become undesirably obvious.

The synthetic resin fine particulate matters used in the invention may be, as a matter of course mixed with plural kinds of additive resin compositions. In the case of using for a base color system, even when the kinds of resins established as the bases are increased, there occurs no troubles by increase of the establishes.

"The pellets are pellets of one color or a mixed state of two or more base colors of those colored in base color(s) or desired color(s)" in the 2nd invention estimates the addition by a base color system. The "base color" is a pellet of a colorant of a clear color such as red, blue, yellow, white, black, etc., and at use, the base colors are mixed to form a desired color, which is applied to a method of coloring the desired color. In the base color system, first one kind of a main additive, or several kinds of additives wherein the composition ratio can be commonly fixed as a general-purpose product are dispersed in a master batch at definite concentrations followed by pelletizing. Similarly, a master batch is produced per each component of all the additives which are finally contained in the desired molding group, and these master batches are used by mixing to a necessary composition for each moldings.

In a method of background art, because corresponding to various colors on each of plural moldings, master batches of the number of the colors had to be separately produced by an extruder, there was a problem that the number of cleaning the extruder for producing master batch each time of changing the color of the master batch was increased as compared with the number of the products and the productivity was bad. However, according to the base color system in the invention, the number of cleaning times of the extruder is limited to the number established as base colors, whereby a mass production becomes possible.

Then, the present invention is described practically by the following examples. In addition, all parts and percentages (%) in the examples and the comparative examples, unless otherwise indicated, are by weight.

The experiment was practiced separately as A and B.

Experiment A: Comparison of the reached time to the target-established supplying amount according to the kind of feeder.

Experiment B: Comparison of accuracy by the shape difference in the supply by ultraviolet feeder.

[Comparison of the reached time to the target-established supplying amount according to the kind of feeder]

EXAMPLE 1

As synthetic resin fine particular matters, columnar master batches each having the length of 1.2 mm and the diameter of 1.0 mm and made of 30% titanium oxide and 70% PP (polypropylene) were prepared.

Using a ultrasonic feeder constituted of a hopper, a load cell, and a ultrasonic vibrator, by establishing a supplying amount of 500 g per hour (8.33 g/minute) as a target, in the first 7 minutes, the supplying amount of the master batches per 60 seconds was determined. Then, from the difference from the target supplying amount, the level of an error was obtained.

COMPARATIVE EXAMPLE 1

By following the same procedure as Example 1 except that a loss-in-weight type quantitative supplier (manufactured by Sangyo Kiden K. K., ALS 250 1LB) constituted of a load cell, a motor, and a screw was used, the supplying amount of the master batches per 60 seconds was determined. Then, from the difference from the target supplying amount, the level of an error was obtained. This was used as the standard of a screw-type feeder.

The results of Example 1 and Comparative Example 1 are shown in Table 1 below.

TABLE 1

| Passed time (min) | Example 1 | | Comparative Example 1 | |
| --- | --- | --- | --- | --- |
| | Supplying amount (g) | Error (%) | Supplying amount (g) | Error (%) |
| 1 | 8.45 | 1.4 | 6.87 | −17.5 |
| 2 | 8.35 | 0.2 | 8.52 | 2.2 |
| 3 | 8.27 | −0.7 | 8.72 | 4.7 |
| 4 | 8.38 | 0.6 | 8.37 | 0.5 |
| 5 | 8.31 | 0.2 | 8.44 | 1.3 |
| 6 | 8.30 | −0.4 | 8.28 | −0.6 |
| 7 | 8.35 | 0.3 | 8.39 | 0.7 |

From the results described above, it can be seen that in the case of using the feeder constituted of a motor and a screw, from 4 to 5 minutes are required for stabilizing to the target supplying amount, while in the case of using the ultrasonic feeder, it becomes possible to stably supply the target supplying amount for one minute.

[Comparison of the reached time to the target-established supplying amount according to the kind of feeder]

COMPARATIVE EXAMPLES 2 TO 6 AND EXAMPLES 2 TO 6

COMPARATIVE EXAMPLE 2

As synthetic resin fine particulate matters, columnar master batches each having the length of 3.0 mm and the diameter of 2.5 mm and made of 30% titanium oxide and 70% PP were prepared. By following the same procedure as Example 1 except that the maser batches prepared above were used, the supplying amount of the master batches per 60 seconds was determined and from the difference from the target supplying amount, the level of an error was obtained. The result is shown in Table 2.

COMPARATIVE EXAMPLE 3

As synthetic resin fine particulate matters, columnar master batches each having the length of 0.2 mm and the diameter of 0.3 mm and made of 10% carbon and 90% PP were prepared. By following the same procedure as Example 1 except that the maser batches prepared above were used, the supplying amount of the master batches per 60 seconds was determined and from the difference from the target supplying amount, the level of an error was obtained. The result is shown in Table 2.

COMPARATIVE EXAMPLE 4

As synthetic resin fine particulate matters, commercially available PP resin-made fine particular matters (manufactured by Grand Polymer Co., Ltd., ZS1337, columnar fine particular matters having the average length of 3.6 mm and the average diameter of 3.3 mm) was provided. By following the same procedure as Example 1 except that the fine particulate provided above were used, the supplying amount of the master batches per 60 seconds was determined and from the difference from the target supplying amount, the level of an error was obtained. The result is shown in Table 3.

EXAMPLE 2

As synthetic resin fine particulate matters, columnar master batches each having the length of 1.5 mm and the diameter of 1.5 mm and made of 10% cyanine blue and 90% PP were prepared. By following the same procedure as Example 1 except that the maser batches prepared above were used, the supplying amount of the master batches per 60 seconds was determined and from the difference from the target supplying amount, the level of an error was obtained. The result is shown in Table 3.

EXAMPLE 3

As synthetic resin fine particulate matters, columnar pellet-form master batches each having the length of 1.0 mm and the diameter of 1.0 mm, wherein the long side (a) of adjacent two sides of a regular square becoming a orthogonal projection was 1.0 mm and the short side (b) was 1.0 mm as a target, and made of 10% titanium oxide and 90% PP were prepared. About the 10 master batches thus prepared, the values of (a) and (b) were correctly measured and when the average value of the values of (a)+(b) was (c) and the standard deviation (n−1) was (d), the value of (d)/(c) was obtained. The measured values of the sizes of the 10 master batches used in Example 3 are shown in Table 7.

Standard deviation (n−1): (d)=0.0568

(d)/(c)=0.0285

By following the same procedure as Example 1 except that the maser batches prepared above were used, the supplying amount of the master batches per 60 seconds was determined and from the difference from the target supplying amount, the level of an error was obtained. The result is shown in Table 4.

EXAMPLE 4

As synthetic resin fine particulate matters, rectangular parallelepiped master batches each having the height of 1.0 mm, the width of 1.2 mm, and the longitudinal length of 1.0 mm and made of 10% carbon black and 90% PP were prepared. By following the same procedure as Example 1 except that the maser batches prepared above were used, the supplying amount of the master batches per 60 seconds was determined and from the difference from the target supplying amount, the level of an error was obtained. The result is shown in Table 4.

COMPARATIVE EXAMPLE 5

As synthetic resin fine particulate matters, columnar master batches each having the diameter of 1.5 mm and the length of 1.7 mm and made of 15% cyanine blue and 85% PET were prepared. By following the same procedure as Example 1 except that the maser batches prepared above were used, the supplying amount of the master batches per 60 seconds was determined and from the difference from the target supplying amount, the level of an error was obtained. The result is shown in Table 5.

COMPARATIVE EXAMPLE 6

As synthetic resin fine particulate matters, rectangular parallelepiped master batches each having the longitudinal length of 0.5 mm, the width of 1.0 mm, and the height of 1.5 mm and made of 30% titanium oxide and 70% PP were prepared. By following the same procedure as Example 1 except that the maser batches prepared above were used, the supplying amount of the master batches per 60 seconds was determined and from the difference from the target supplying amount, the level of an error was obtained. The result is shown in Table 5.

EXAMPLE 5

As synthetic resin fine particulate matters, rectangular parallelepiped master batches each having the longitudinal length of 0.8 mm, the width of 1.2 mm, and the height of 1.5 mm and made of 10% iron oxide red and 90% PET were prepared. In the master batches, the long side (a) of the two adjacent sides of a rectangle becoming a orthogonal projection was 1.2 mm and the short side (b) was 0.8 mm. By following the same procedure as Example 1 except that the maser batches prepared above were used, the supplying amount of the master batches per 60 seconds was determined and from the difference from the target supplying amount, the level of an error was obtained. The result is shown in Table 6.

EXAMPLE 6

As synthetic resin fine particulate matters, rectangular parallelepiped master batches each having the longitudinal length of 1.0 mm, the width of 0.8 mm, and the height of 1.0 mm, wherein the long side (a) of adjacent two sides of a rectangle becoming a orthogonal projection was 1.0 mm and the short side (b) was 0.8 mm as a target, and made of 10% titanium oxide and 90% PP were prepared. About the 10 master batches thus prepared, the values of (a) and (b) were correctly measured and when the average value of the values of (a)+(b) was (c) and the standard deviation (n−1) was (d), the value of (d)/(c) was obtained. The measured values of the sizes of the 10 master batches used in Example 6 are shown in Table 7.

Standard deviation (n−1): (d)=0.1943
(d)/(c)=0.102

By following the same procedure as Example 1 except that the maser batches prepared above were used, the supplying amount of the master batches per 60 seconds was determined and from the difference from the target supplying amount, the level of an error was obtained. The result is shown in Table 6.

TABLE 2

|  | Comparative Example 2 | | Comparative Example 3 | |
|---|---|---|---|---|
| Passed time (min) | Supplying amount (g) | Error (%) | Supplying amount (g) | Error (%) |
| 1 | 8.38 | 0.6 | 8.37 | 0.5 |
| 2 | 8.82 | 5.8 | 8.35 | 0.2 |
| 3 | 7.73 | −7.2 | 8.33 | 0 |
| 4 | 8.88 | 6.6 | 8.23 | −1.2 |
| 5 | 8.34 | 0.1 | 8.06 | −3.2 |

TABLE 2-continued

|  | Comparative Example 2 | | Comparative Example 3 | |
|---|---|---|---|---|
| Passed time (min) | Supplying amount (g) | Error (%) | Supplying amount (g) | Error (%) |
| 6 | supply stop | — | 8.08 | −3.0 |
| 7 | supply stop | — | 7.92 | −4.9 |

TABLE 3

|  | Comparative Example 4 | | Example 2 | |
|---|---|---|---|---|
| Passed time (min) | Supplying amount (g) | Error (%) | Supplying amount (g) | Error (%) |
| 1 | supply stop | — | 8.38 | 0.6 |
| 2 | supply stop | — | 8.35 | 0.2 |
| 3 | supply stop | — | 8.34 | 0.1 |
| 4 | supply stop | — | 8.38 | 0.6 |
| 5 | supply stop | — | 8.31 | −0.2 |
| 6 | supply stop | — | 8.33 | 0 |
| 7 | supply stop | — | 8.31 | −0.2 |

TABLE 4

|  | Example 3 | | Example 4 | |
|---|---|---|---|---|
| Passed time (min) | Supplying amount (g) | Error (%) | Supplying amount (g) | Error (%) |
| 1 | 8.44 | 1.3 | 8.36 | 0.4 |
| 2 | 8.33 | 0 | 8.38 | 0.6 |
| 3 | 8.32 | −0.1 | 8.37 | 0.5 |
| 4 | 8.37 | 0.5 | 8.32 | −0.1 |
| 5 | 8.34 | 0.1 | 8.34 | 0.1 |
| 6 | 8.36 | 0.4 | 8.34 | 0.1 |
| 7 | 8.35 | 0.2 | 8.36 | 0.4 |

TABLE 5

|  | Comparative Example 5 | | Comparative Example 6 | |
|---|---|---|---|---|
| Passed time (min) | Supplying amount (g) | Error (%) | Supplying amount (g) | Error (%) |
| 1 | 7.64 | −8.3 | 7.66 | −8.0 |
| 2 | 9.33 | 12.0 | 7.24 | −13.1 |
| 3 | 8.43 | 1.2 | 7.16 | −14.2 |
| 4 | 8.97 | 7.7 | supply stop | — |
| 5 | supply stop | — | supply stop | — |
| 6 | supply stop | — | supply stop | — |
| 7 | supply stop | — | supply stop | — |

TABLE 6

|  | Example 5 | | Example 6 | |
|---|---|---|---|---|
| Passed time (min) | Supplying amount (g) | Error (%) | Supplying amount (g) | Error (%) |
| 1 | 8.38 | 0.6 | 8.30 | −0.4 |
| 2 | 8.26 | −0.8 | 8.37 | 0.5 |
| 3 | 8.37 | 0.5 | 8.42 | 1.1 |
| 4 | 8.42 | 1.1 | 8.41 | 1.0 |
| 5 | 8.34 | 0.1 | 8.27 | −0.7 |
| 6 | 8.41 | 1.0 | 8.33 | 0.0 |
| 7 | 8.23 | −1.2 | 8.40 | 0.8 |

TABLE 7

|   | Example 3 | | Example 6 | |
|---|---|---|---|---|
|   | (a) + (b) | Sum total | (a) + (b) | Sum total |
| 1 | 1.0 + 1.0 | 2.0 | 0.8 + 0.9 | 1.7 |
| 2 | 1.0 + 1.0 | 2.0 | 0.8 + 0.9 | 1.7 |
| 3 | 1.0 + 0.9 | 1.9 | 0.9 + 1.1 | 2.1 |
| 4 | 1.0 + 1.0 | 2.0 | 0.9 + 1.1 | 2.1 |
| 5 | 1.0 + 0.9 | 1.9 | 0.8 + 0.9 | 1.7 |
| 6 | 1.0 + 1.0 | 2.0 | 0.8 + 0.9 | 1.7 |
| 7 | 1.0 + 1.0 | 2.0 | 0.9 + 1.1 | 2.0 |
| 8 | 1.0 + 1.0 | 2.0 | 0.8 + 1.0 | 1.8 |
| 9 | 1.1 + 1.0 | 2.1 | 0.8 + 1.3 | 2.1 |
| 10 | 1.0 + 1.0 | 2.0 | 0.9 + 1.2 | 2.1 |
|   |   | average = (c) 1.99 |   | Average = (c) 1.90 |

From the results shown above, it can be seen that as shown in Examples 2, 3, and 4, in the case of the resin fine particulate matters having the shapes in the scope of the invention described above (or the claims described below), the supplying amount of the master batches reaches the target supply amount after one minute since the initiation of the supply.

However, in the case of using the resin fine particulate matters having a large shape as in Comparative Example 2, the quantitative supplying property is bad and when the feeder is operated for a long time, the resin fine particular matters cause clogging surrounding the hopper or the vibrator.

Also, in Comparative Example 3, because the resin fine particular matters of the shape smaller than the scope of the invention, the fine particles are liable to be electrostatically charged, which results in giving bad influence on the quantitative supplying. Also, the shape is almost a fine powder, the particles are hard to use because of the occurrences of scattering and attaching by static electricity.

In Comparative Example 5, the value of x+y+z of the resin fine particulate matters is 4,7 mm, which is outside the upper limit of the defined range of the invention, whereby the supplying stop occurs. The result is in contradistinction to compare with the case of Example 2 using the resin fine particular matters having the value of x+y+z is 4.5 mm.

Also, in Comparative Example 6, the value of x+y+z is 3.0 mm, which is in the defined range of the invention but one of x, y, and z is lower than 0.6 mm which is the value corresponding to 20% of the sum (x+y+z). In the comparative example, the resin fine particular mattes have the shape of a rectangular parallelepiped but the shape is near a sheet shape or a long slender shape and it is difficult to stably quantitative supply the fine particular matters with a high accuracy. The result is in contradistinction to compare with the case of Example 3 using the resin fine particular matters wherein the value of x+y+z is 3.0 mm and each value of x, y, and z exceeds the value corresponding to 20%

Example 5 is the case that the value of (a)/(b) defined above becomes 1.5. In Example 5, the average of the absolute values of the errors of the supplying amounts is 0.76%. In Example 3 wherein the value of (a)/(b) is 1.0 in the range defined in the invention as described above, the average of the absolute values of the errors of the supplying amounts is 0.37, and thus it can be seen that by limiting the value of (a)/(b) in the range defined in the invention as described above, the quantitative stable supplying performance is improved.

Also, Example 6 wherein the value of (a)/(b) is 1.25 which is in the range defined in the invention is the case that the value of (d)/(c) is 0.102 which exceeds the range defined in the invention, which shows that the shapes of the master batches used are ununiform to some extent. In Example 6, the average of the absolute values of the errors of the supplying amounts is 0.54, in Example 3 wherein the values of (a)/(b) and (d)/(c) are 1.0 and 0.0285 respectively in the ranges defined in the invention, the average of the absolute values of the errors of the supplying amounts is 0.37, and it can be seen that by limiting the values of (a)/(b) and (d)/(c) in the ranges defined in the invention (or claim 4 described below), the quantitative stable supplying performance is improved.

As described above, according to the quantitative continuous extrusion supplying method of the invention, by s using a small-sized ultrasonic feeder wherein cleaning thereof is simple and the supplying amount reaches an established supplying amount as the target in a short time and by limiting the shape of the synthetic resin fine particulate matters to be supped to a specific range, even large resin fine particular matters of 500 μm or larger, which could not be used in a ultrasonic feeder, can be stably and continuously supplied.

Also, according to the quantitative continuous extrusion supplying method of the invention, even large resin fine particular matters which are larger for a ultrasonic feeder than those in a background art, larger resin fine particular matters than the size of resin fine particular matters which are applied to a quantitative supplier of background art having a screw or a spiral rod and a motor, can be stably and continuously supplied, and thus even in the system that the concentration of a colorant is higher than a master batch applied to a quantitative supplier of background art, and the dilution ratio becomes high, the conventional dilution uniformity can be easily maintained.

While the invention has been described in detail and with reference to specific embodiments thereof, it will be apparent to one skilled in the art that various changes and modifications can be made therein without departing from the spirit and scope thereof.

This application is based on Japanese patent applications No. Hei-11-268551 filed on Sep. 22, 1999 and No. 2000-252598 filed on Aug. 23, 2000, incorporated herein by reference.

What is claimed is:

1. A quantitative extrusion supplying method comprising the step of continuously supplying synthetic resin fine particulate matters by the action of ultrasound vibrations, wherein the synthetic resin fine particulate matters are columnar or square column-form pellets, in which when a longitudinal length, a width, and a height thereof on the three-dimensional rectangular coordinate X-Y-Z system are x, y, and z respectively, the sum (x+y+z) of the longitudinal length, the width, and the height is in the range of from 0.9 to 4.6 mm, and each value of x, y, and z is at least 20% of the sum (x+y+z) of the longitudinal length, the width, and the height.

2. A method of producing extruded moldings or injection moldings comprising the steps of:

supplying a raw material resin to be colored or to be added to an inlet of a screw feed extruder, continuously supplying a particulate colorant or a particulate additive through a quantitative supplying apparatus to the extruder separately from the raw material resin from an inlet separately formed from the inlet for the raw material resin, and melt-kneading the both constituents, wherein (A) the colorant or the additive is columnar or square column-form pellets, in which when a longitudinal length, a width, and a height thereof on the three-dimensional rectangular coordinate X-Y-Z system are x, y, and z respectively, the sum (x+y+z) of the longitudinal length, the width, and the height is in the range of from 0.9 to 4.6 mm, and each value of x, y, and z is at least 20% of the sum (x+y+z) of the longitudinal length, the width, and the height, (B) the pellets are pellets of one color colored in a base color or a desired color or of a mixed state of at least two base colors, or are pellets containing at least one additive other than a colorant, and (C) the quantitative supplying apparatus of the colorant or the additive is an apparatus of quantitatively extruding supplying the synthetic resin fine particulate matters by the action of ultrasonic waves.

* * * * *